United States Patent
Ge

(10) Patent No.: US 9,185,567 B2
(45) Date of Patent: Nov. 10, 2015

(54) METHOD, DEVICE AND SYSTEM FOR SHARING TRANSMISSION BANDWIDTH BETWEEN DIFFERENT SYSTEMS

(71) Applicant: HUAWEI TECHNOLOGIES CO., LTD., Shenzhen (CN)

(72) Inventor: Chenhui Ge, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 254 days.

(21) Appl. No.: 13/928,967

(22) Filed: Jun. 27, 2013

(65) Prior Publication Data

US 2013/0336121 A1    Dec. 19, 2013

Related U.S. Application Data

(63) Continuation of application No. PCT/CN2011/085043, filed on Dec. 30, 2011.

(30) Foreign Application Priority Data

Dec. 31, 2010  (CN) ........................ 2010 1 0624348

(51) Int. Cl.
*H04W 16/14* (2009.01)
*H04L 12/803* (2013.01)
(Continued)

(52) U.S. Cl.
CPC .......... *H04W 16/14* (2013.01); *H04W 28/0247* (2013.01); *H04W 28/0284* (2013.01); *H04W 28/08* (2013.01); *H04W 28/10* (2013.01)

(58) Field of Classification Search
None
See application file for complete search history.

(56) References Cited

U.S. PATENT DOCUMENTS 6,665,272 B1 * 12/2003 Pankaj ................... H04W 28/18
370/229
7,782,774 B2 * 8/2010 Cheriton ................. H04L 47/20
370/232

(Continued)

FOREIGN PATENT DOCUMENTS

CN       1735231 A    2/2006
CN       1774124 A    5/2006
(Continued)

OTHER PUBLICATIONS

International Search Report mailed Apr. 5, 2012 in corresponding International Application No. PCT/CN2011/085043.

(Continued)

*Primary Examiner* — Candal Elpenord
(74) *Attorney, Agent, or Firm* — Staas & Halsey LLP

(57) ABSTRACT

Embodiments of the present invention provide a method, a device, and a system for sharing transmission bandwidth between different systems, and belong to the communications field. When a first communications system and one or more other communications systems share transmission bandwidth, the method includes: comparing, by a first network element in the first communications system, the sum of rates at which a service is sent to a second network element in the first communications system with bandwidth preconfigured for the second network element; adjusting, by the first network element based on a comparison result, a transmission priority of the service sent to the second network element; and adjusting, by the first network element based on transmission congestion status of the first communications system, sending bandwidth for transmitting the service to the second network element.

19 Claims, 6 Drawing Sheets

(51) Int. Cl.
*H04L 12/815* (2013.01)
*H04W 28/08* (2009.01)
*H04W 28/02* (2009.01)
*H04W 28/10* (2009.01)

(56) References Cited

U.S. PATENT DOCUMENTS

| | | | |
|---|---|---|---|
| 8,797,858 B2* | 8/2014 | Ye | 370/230 |
| 2002/0131365 A1* | 9/2002 | Barker | H04L 47/10 370/235 |
| 2007/0058536 A1* | 3/2007 | Vaananen | H04L 12/5693 370/230 |
| 2008/0125139 A1* | 5/2008 | Ishizaki | H04L 47/10 455/453 |
| 2008/0165687 A1 | 7/2008 | Wang | |
| 2008/0170557 A1 | 7/2008 | Yin | |
| 2008/0198802 A1* | 8/2008 | Zhang | H04W 28/08 370/329 |
| 2008/0291927 A1* | 11/2008 | Yong | H04L 47/10 370/400 |
| 2009/0005053 A1* | 1/2009 | Agin | H04L 47/10 455/450 |
| 2010/0144365 A1* | 6/2010 | Pan | H04W 72/0486 455/453 |
| 2011/0075750 A1 | 3/2011 | Miki et al. | |
| 2012/0020221 A1* | 1/2012 | Bugenhagen | H04L 47/11 370/253 |
| 2013/0077554 A1 | 3/2013 | Gauvreau et al. | |

FOREIGN PATENT DOCUMENTS

| | | |
|---|---|---|
| CN | 1794696 A | 6/2006 |
| CN | 1794864 A | 6/2006 |
| CN | 1801961 A | 7/2006 |
| CN | 101163096 A | 4/2008 |
| CN | 101631068 A | 1/2010 |
| CN | 101646196 A | 2/2010 |
| CN | 101924999 A | 12/2010 |
| CN | 102123444 A | 7/2011 |
| EP | 1503606 A1 | 7/2003 |
| EP | 2645768 A1 | 10/2013 |
| KR | 10-2009-0090405 | 8/2009 |
| KR | 10-2011-0007145 | 1/2011 |
| KR | 10-2014-0069284 | 6/2014 |
| WO | 2009/119385 A1 | 1/2009 |
| WO | 2009/112482 A2 | 9/2009 |

OTHER PUBLICATIONS

PCT/ISA/210 International Search Report (& English translation) and PCT Written Opinion PCT/ISA 237 dated Apr. 5, 2012 in corresponding PCT/CN2011/085043 (12 pages).
Korean Office Action dated Dec. 26, 2014 in related Korean Patent Application No. 10-2013-7017674 (4 pages) (2 pages English Translation).
Extended European Search Report dated Dec. 5, 2013 in corresponding European Patent Application No. 11852225.9 (6 pages).
Notice of Allowance dated Apr. 29, 2015 in related Korean Patent Application No. Oct. 2013-7017674 (2 pp.) (1 page English Translation).

* cited by examiner

METHOD, DEVICE AND SYSTEM FOR SHARING TRANSMISSION BANDWIDTH BETWEEN DIFFERENT SYSTEMS

CROSS-REFERENCE TO RELATED APPLICATION

This application is a continuation of International Application No. PCT/CN2011/085043, filed on Dec. 30, 2011, which claims priority to Chinese Patent Application No. 201010624348.X, filed on Dec. 31, 2010, both of which are hereby incorporated by reference in their entireties.

TECHNICAL FIELD

The present invention relates to the field of wireless communications technologies, and in particular, to a method, a device, and a system for sharing transmission bandwidth between different systems.

BACKGROUND

On an actual network, a UMTS (Universal Mobile Telecommunications System, universal mobile telecommunications system) base station (NodeB, UTRAN node B) and an LTE (Long Term Evolution, long term evolution) base station (eNodeB, E-UTRAN node B) may be deployed on the same site. In this case, an Iub interface between an RNC (Radio Network Controller, radio network controller) and a NodeB and an S1 interface between an SAE (System Architecture Evolution, system architecture evolution) and an eNodeB share bandwidth for the last mile in terrestrial transmission (as shown in FIG. 1). Usually, it costs too much on transmission in a base station, and bandwidth is limited. A reasonable mechanism is required for distributing shared transmission bandwidth between two systems of the UMTS base station and the LTE base station.

To solve the foregoing problem, currently, in the prior art makes the RNC and the SAE perform traffic molding respectively according to configured bandwidth thereof. The disadvantage of this manner is: if UMTS service traffic is very heavy and is close to total transmission bandwidth, LTE traffic becomes very light and may be starved to death.

However, based on the prior art introduced in the foregoing, in the prior art, a solution to distributing shared transmission bandwidth between inter-system network elements does not realize improving transmission bandwidth efficiency by fairly distributing transmission bandwidth shared between a UMTS system and an LTE system.

SUMMARY

Embodiments of the present invention provide a method, a device, and a system for sharing transmission bandwidth between different systems, so that when transmission bandwidth is shared by different systems, the shared transmission bandwidth is fairly distributed to effectively improve transmission bandwidth efficiency and avoid the problem of transmission bandwidth contention between inter-system network elements.

The embodiments of the present invention may be specifically implemented by using the following technical solutions.

In an aspect, a method for sharing transmission bandwidth between different systems is provided. When a first communications system and one or more other communications systems share transmission bandwidth, the method includes:

comparing, by a first network element in the first communications system, the sum of rates at which a service is sent to a second network element in the first communications system with bandwidth preconfigured for the second network element;

adjusting, by the first network element based on a comparison result, a transmission priority of the service sent to the second network element; and adjusting, by the first network element based on transmission congestion status of the first communications system, sending bandwidth for transmitting the service to the second network element.

A communications device is also provided, where the device includes:

a comparison unit, adapted to compare the sum of rates at which a service is sent to a second network element in a first communications system with bandwidth preconfigured for the second network element, in which the first communications system shares transmission bandwidth with one or more other communications systems;

a priority adjustment unit, adapted to adjust, based on a comparison result, a transmission priority of the service sent to the second network element; and a sending bandwidth dynamic adjustment unit, adapted to adjust, based on transmission congestion status of the first communications system, sending bandwidth for transmitting the service to the second network element.

In another aspect, a communications system is also provided, where the communications system includes a first communications system and one or more other communications systems, and the first communications system and the one or more other communications systems share transmission bandwidth; and the first communications system includes the foregoing communications device.

It can be seen from the technical solutions provided by the foregoing embodiments of the present invention, in an embodiment of the present invention, a first network element in a first communications system dynamically adjusts, based on the sum of rates at which a service is sent, a transmission priority of a service sent to a second network element, and dynamically adjusts, based on obtained transmission congestion status of the first communications system, sending bandwidth for transmitting a service to the second network element, thereby fairly distributing shared transmission bandwidth between different systems sharing transmission bandwidth, and effectively improving transmission bandwidth utilization efficiency, ensuring fairness of bandwidth distribution between different systems, and solving the problem of bandwidth contention between different systems during co-transmission.

DESCRIPTION OF EMBODIMENTS

To make the objectives, technical solutions, and advantages of the present invention clearer and more explicit, the following further describes in detail the technical solutions of the present invention with reference to accompanying drawings and embodiments.

Figure 2:
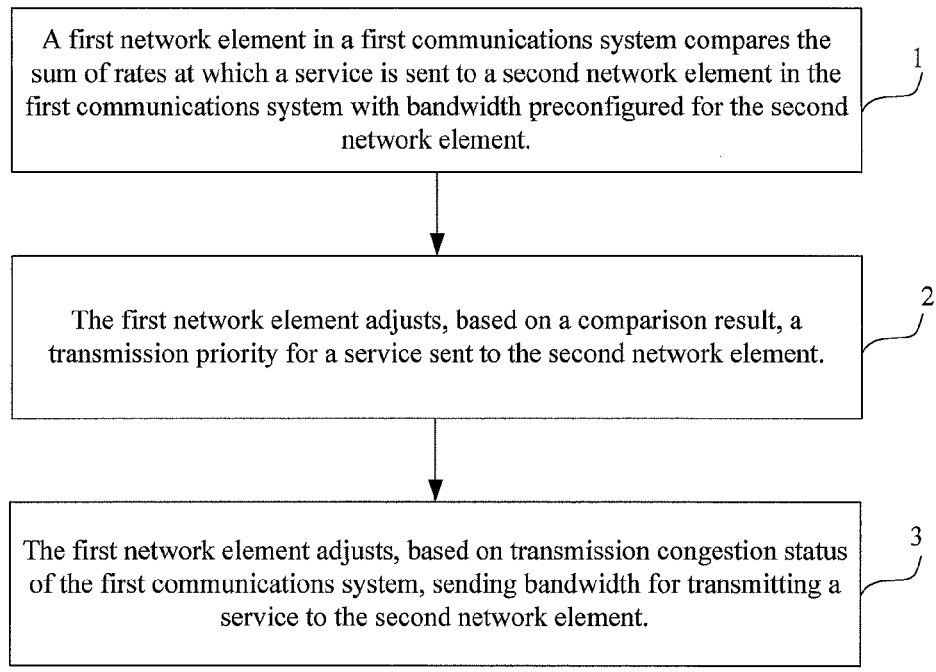
FIG. 2 is a flowchart of a method according to an embodiment of the present invention.

An embodiment of the present invention provides a method for sharing transmission bandwidth between different systems, which is used when a first communications system and one or more other communications systems share transmission bandwidth, to perform fair distribution of bandwidth. As shown in FIG. 2, the method according to this embodiment includes the following contents.

Step 1: A first network element in the first communications system compares the sum (which refers to the actually sent data volume based on unit time) of rates at which a service is sent to a second network element in the first communications system with bandwidth preconfigured for the second network element; in which, the bandwidth preconfigured for the second network element is transmission bandwidth required for ensuring that the first network element works in full load when the first network element in the first communications system and a network element in another communications system sharing transmission bandwidth both work in full load.

Step 2: The first network element adjusts, based on a comparison result, a transmission priority of the service sent to the second network element.

The adjusting, based on a comparison result, a transmission priority of the service sent to the second network element may specifically be:

when the sum of rates does not exceed the bandwidth preconfigured for the second network element, adjusting, by the first network element, a transmission priority of a non-real-time service packet sent to the second network element to be higher than a transmission priority of a service packet in the one or more other communications systems; and when the sum of rates exceeds the bandwidth preconfigured for the second network element, adjusting, by the first network element, a transmission priority of the non-real-time service packet sent to the second network element to be equal to or lower than a transmission priority of the service packet in the one or more other communications systems.

Step 3: The first network element adjusts, based on transmission congestion status of the first communications system, sending bandwidth for transmitting the service to the second network element.

In step 3, the transmission congestion status of the first communications system is obtained by monitoring a transmission channel between the first network element and the second network element, where a detailed process is: a structured measurement packet (a measurement packet includes a detection packet and a response packet) is transmitted on the transmission channel between the first network element and the second network element, and congestion status of the transmission channel is obtained by monitoring transmission quality of the transmitted measurement packet. When the transmission channel is in congested status, the sending bandwidth for transmitting the service packet (which may be all non-real-time service packets) to the second network element is decreased and the sending bandwidth is limited not to be lower than the bandwidth preconfigured for the second network element; or, when the transmission channel is in decongested status, the sending bandwidth for transmitting the service packet (which may be all non-real-time service packets) to the second network element is increased and the sending bandwidth is limited not to exceed total transmission bandwidth.

The foregoing method may also include: when the first network element in the first communications system transmits the service to the second network element, performing traffic molding based on the sending bandwidth and limiting the sending bandwidth not to exceed the sending bandwidth for transmitting the service to the second network element after being adjusted by the first network element based on the transmission congestion status of the first communications system.

In the foregoing method, when two or a plurality of communications systems share transmission bandwidth, based on the sum of rates at which a service is sent by the first network element in the first communications system to the second network element, a transmission priority of a non-real-time service packet sent to the network element is dynamically adjusted, and based on transmission congestion status of the transmission channel between the first network element and the second network element in the first communications system obtained through monitoring, sending bandwidth to the second network element is dynamically adjusted, thereby ensuring fairness of bandwidth distribution and solving the problem of bandwidth contention between two or a plurality of communications systems sharing transmission bandwidth.

Figure 1:
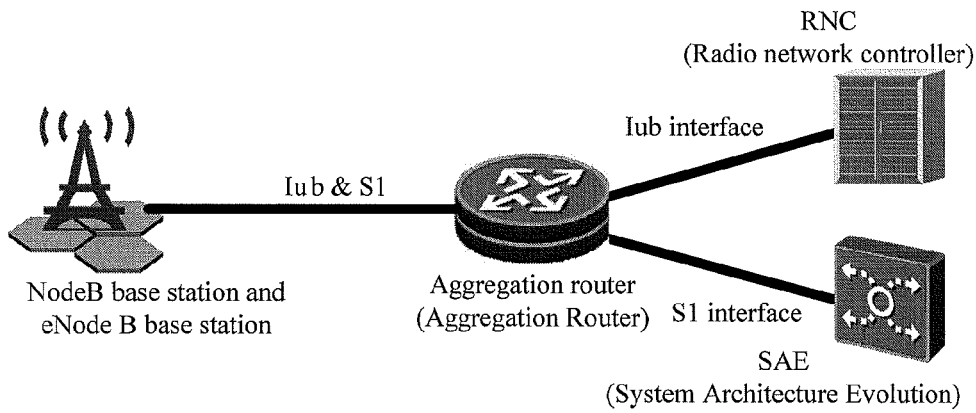
FIG. 1 is a schematic diagram of a co-transmission scenario of a UMTS base station and an LTE base station according to the prior art.

The following further describes the foregoing method with reference to a scenario of co-transmission between a UMTS (Universal Mobile Telecommunications System, universal mobile telecommunications system) and LTE (Long Term Evolution, long term evolution) in FIG. 1 and by taking a situation of sharing transmission bandwidth between the UMTS and the LTE as an example, in which, the UMTS is a first communications system, a first network element in the first communications system is an RNC (Radio Network Controller, radio network controller), a second network element is a NodeB (UTRAN NodeB, E-UTRAN node B, universal terrestrial radio access network node B), and the LTE serves as one or more other communications systems. The method includes:

configuring UMTS guaranteed bandwidth (UMTS Guaranteed Bandwidth, UGBW) parameters, the guaranteed bandwidth UGBW is transmission bandwidth expected to be distributed to the UMTS when two systems of UMTS and LTE are busy (work in full load);

dynamically marking a transmission priority of a UMTS service packet: when a sending rate of the RNC does not exceed UGBW, a transmission priority of a UMTS non-real-time service packet (a non-real-time service packet transmitted by the RNC to the NodeB) is marked as a high priority (higher than a transmission priority of an LTE service packet. During initial configuration, the transmission priority of an LTE service packet may be marked as a low priority); when a sending rate of the RNC exceeds UGBW, a transmission priority of a UMTS non-real-time service packet (a non-real-time service packet transmitted by the RNC to the NodeB) is marked as a low priority (the same as a transmission priority of an LTE service packet. During initial configuration, the transmission priority of an LTE service packet may be marked as a low priority); and dynamically adjusting sending bandwidth for the RNC: transmission congestion status of an Iub interface is dynamically monitored and obtained by using an IP PM mechanism and so on. When the Iub interface is in congested status, the sending bandwidth for an RNC is decreased, and the decreased sending bandwidth is limited not to be lower than guaranteed bandwidth UGBW; or, when the Iub interface is in decongested status, the sending bandwidth for an RNC is decreased, and the increased sending bandwidth for an RNC is limited not to exceed total transmission bandwidth, that is, when the sending bandwidth for an RNC is adjusted, it is ensured that the minimum is not lower than guaranteed bandwidth UGBW and the maximum does not exceed total transmission bandwidth. The RNC performs traffic molding based on adjusted sending bandwidth, specifically, reference may be made to description of the prior art for a traffic molding manner, which is not described herein again.

In the foregoing step for dynamically adjusting the sending bandwidth for the RNC, the transmission congestion status of the Iub interface, may be obtained by structuring a measurement packet (including a detection packet and a response packet) and monitoring transmission quality of the transmitted measurement packet, and transmission congestion status of a transmission channel may be obtained by measuring transmission quality (for example, measuring counters including packet loss rate, delay and jitter, and so on). In an actual application, the transmission congestion status may be determined by using different transmission quality standards based on different application scenarios. The following gives an example for specific description:

accumulate the number of sent packets on the Iub interface;

send a detection packet to a NodeB every detection packet sending period (for example, 100 ms). Detection packet frame number contents include: a frame number, the number of sent packets (that is the accumulated number of sent packets on an Iub interface) and sending time (that is time for sending a detection packet);

calculate a delay after a response packet frame sent by the NodeB is received:

a delay=receiving time in a response packet frame–
sending time in a response frame;

and
perform transmission congestion judgment every congestion judgment period (for example, 1s):

calculating the total number of sent packets in a current congestion judgment period: the number of sent packets of the last response packet received in the current period–the number of sent packets of the last response packet received in the previous period;

calculating the total number of received packets in a current congestion judgment period: the number of received packets of the last response packet received in the current period–the number of received packets of the last response packet received in the previous period;

calculating the average packet loss rate in a current congestion judgment period: (the total number of sent packets in the period–the total number of received packets in the period)÷the total number of sent packets in the current period; and calculating the average delay in a current congestion judgment period (defined as: the sum of delays of all received response packets÷the total number of all received response packets).

If an average packet loss rate exceeds a congestion judgment threshold (for example, 10%) or an average delay exceeds a congestion judgment threshold (for example, 50 ms), it is considered that the transmission congestion status is "congested status"; otherwise, it is considered that the transmission congestion status is "decongested status".

If the transmission congestion status changes, it is notified to a sending bandwidth dynamic adjustment unit.

A function of setting a transmission quality measurement subunit B on the NodeB side is to detect transmission quality of an Iub interface, where basic contents are as follows:

accumulate the number of received packets on the Iub interface; and after receiving a detection packet sent by an RNC, structure a response packet and reply to the RNC; where contents of a response packet include: a frame number (which is the frame number in a detection packet), the number of sent packets (which is the number of sent packets in a detection packet), sending time (which is the sending time in a detection packet), the number of received packets (which is the accumulated number of received packets on an Iub interface) and receiving time (which is the time for receiving a detection packet).

In this way, by using the foregoing manner for measuring each counter, including transmission quality and so on, monitoring may be performed on the transmission congestion status of the Iub interface, to obtain the transmission congestion status of a transmission channel.

In the foregoing inter-system co-transmission scenario, when a network element (SAE, System Architecture Evolution, system architecture evolution) in LET transmits a service to an eNodeB (E-UTRAN NodeB, E-UTRAN node B, evolved universal terrestrial radio access network node B), traffic molding may be performed based on shared total transmission bandwidth.

If a first network element in a first communications system (UMTS) is a NodeB and a second network element is an RNC, when the NodeB transmits a service packet to the RNC, reference may be made to the foregoing description for the handling process of distributing bandwidth, which is basically the same as the foregoing process, and is not repeated herein again.

In the foregoing method, a transmission priority of a UMTS non-real-time service packet is dynamically adjusted based on the sum of rates at which the RNC transmits a service, and sending bandwidth for the RNC is dynamically adjusted based on transmission congestion status, to implement fair distribution of transmission bandwidth shared between different systems, thereby solving the problem of bandwidth contention between different systems sharing transmission bandwidth, and ensuring fairness of bandwidth distribution between two or a plurality of communications system. During bandwidth distribution between two communications systems, if a system is idle, while the other system has sufficient traffic, bandwidth of the idle system may be used, to implement bandwidth statistics multiplexing between the two systems; and if the two systems both have sufficient bandwidth, the size of UMTS service traffic received by a base station (NodeB) is guaranteed bandwidth (UGBW), and the size of received LTE service traffic is (total transmission bandwidth–UGBW), thereby ensuring fairness of bandwidth distribution between the two systems.

Figure 3:
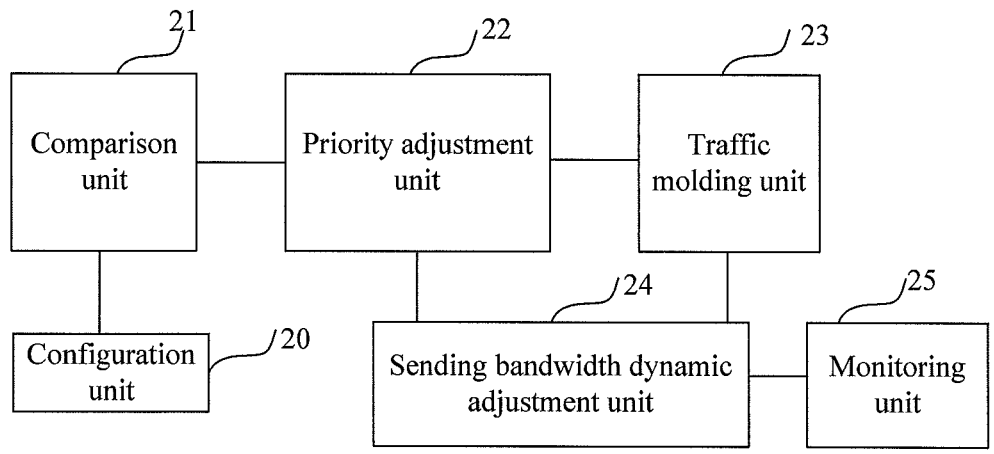
FIG. 3 is a structural block diagram of a communications device according to an embodiment of the present invention.

An embodiment of the present invention provides a communications device, which may be used in a system in which different systems including a first communications system and one or more other communications systems share transmission bandwidth. The first communications system may adopt the communications device. As shown in FIG. 3, the communications device includes:

a comparison unit 21, a priority adjustment unit 22, and a sending bandwidth dynamic adjustment unit 24; where the comparison unit 21, connected to the priority adjustment unit 22, is adapted to compare the sum of rates at which a service is sent to a second network element in the first communications system with bandwidth preconfigured for the second network element;

the priority adjustment unit 22 is adapted to adjust, based on a comparison result obtained through comparison by the comparison unit 21, a transmission priority of the service sent to the second network element; and the sending bandwidth dynamic adjustment unit 24, connected to the priority adjustment unit 22, is adapted to adjust, based on transmission congestion status of the first communications system obtained by a monitoring unit, sending bandwidth for transmitting the service to the second network element.

Figure 4:
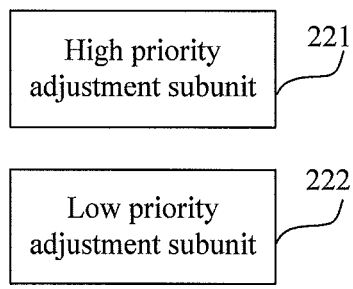
FIG. 4 is a structural block diagram of a priority adjustment unit of a communications device according to an embodiment of the present invention.

As shown in FIG. 4, the priority adjustment unit 22 in the foregoing communications device includes: a high priority adjustment subunit and a low priority adjustment subunit; where the high priority adjustment subunit 221 is adapted to, when the sum of rates compared by the comparison unit does not exceed bandwidth preconfigured for the second network element, adjust a transmission priority of a service packet sent to the second network element to be higher than a transmission priority of a service packet in the one or more other communications systems; and the low priority adjustment subunit 222 is adapted to, when the sum of rates compared by the comparison unit exceeds the bandwidth preconfigured for the second network element, adjust a transmission priority of a service packet sent to the second network element to be equal to or lower than a transmission priority of a service packet in the one or more other communications systems.

Figure 5:
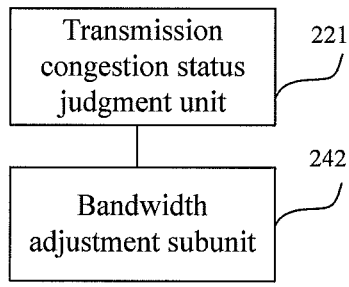
FIG. 5 is a structural block diagram of a sending bandwidth dynamic adjustment unit of a communications device according to an embodiment of the present invention.
Figure 6:
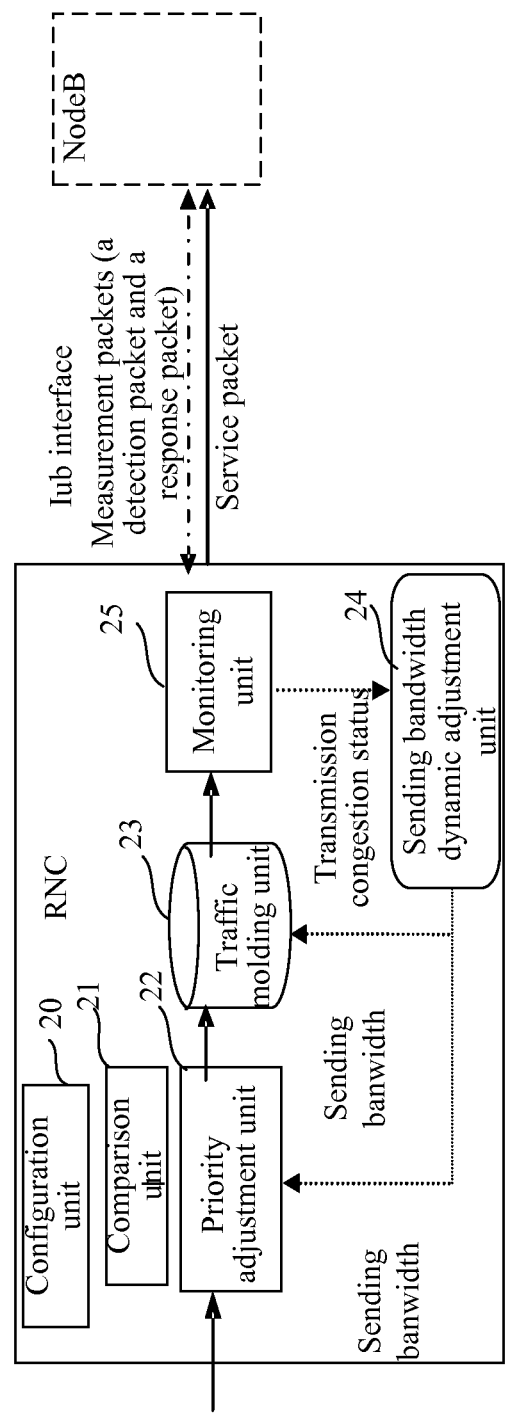
FIG. 6 is a schematic structural diagram of a communications device serving as an RNC according to an embodiment of the present invention.

As shown in FIG. 5, the sending bandwidth dynamic adjustment unit 24 of the foregoing communications device includes: a transmission congestion status judgment unit 241 and a bandwidth adjustment subunit 242; where the transmission congestion status judgment unit 241 is adapted to perform judgment on obtained transmission congestion status of the first communications system; and the bandwidth adjustment subunit 242 is adapted to, when the transmission congestion status obtained by the transmission congestion status judgment unit is congested status, decrease sending bandwidth for transmitting a service to the second network element and limit the decreased sending bandwidth not to be lower than bandwidth preconfigured for the second network element; or, when the transmission congestion status obtained by the transmission congestion status judgment unit is decongested status, to increase sending bandwidth for transmitting the service to the second network element and limit the increased sending bandwidth not to exceed total transmission bandwidth.

The foregoing communications device also includes: a traffic molding unit 23, respectively connected to the priority adjustment unit 22 and the sending bandwidth dynamic adjustment unit 24, adapted to mold traffic based on sending bandwidth, when the service is transmitted to the second network element in the first communications system, and limit the sending bandwidth not to exceed sending bandwidth determined by the sending bandwidth dynamic adjustment unit.

The foregoing communications device also includes: a monitoring unit 25, connected to the sending bandwidth dynamic adjustment unit 24, adapted to monitor and obtain transmission congestion status of the first communications system; where the monitoring unit 25 may be in communication connection with the second network element in the first communications system, and the two cooperate with each other to obtain transmission congestion status of the transmission channel between the monitoring unit and the second network element by transmitting a structured measurement packet in a transmission channel between the monitoring unit and the second network element and monitoring transmission quality of the transmitted measurement packet (including a detection packet and a response packet). Reference may be made to description in the foregoing method for a specific monitoring process.

On the basis of the foregoing communications device, a configuration unit 20 may also be set, which is adapted to configure bandwidth (that is, guaranteed bandwidth UGBW) preconfigured for transmitting a service packet to the second network element in the first communications device.

Figure 8:
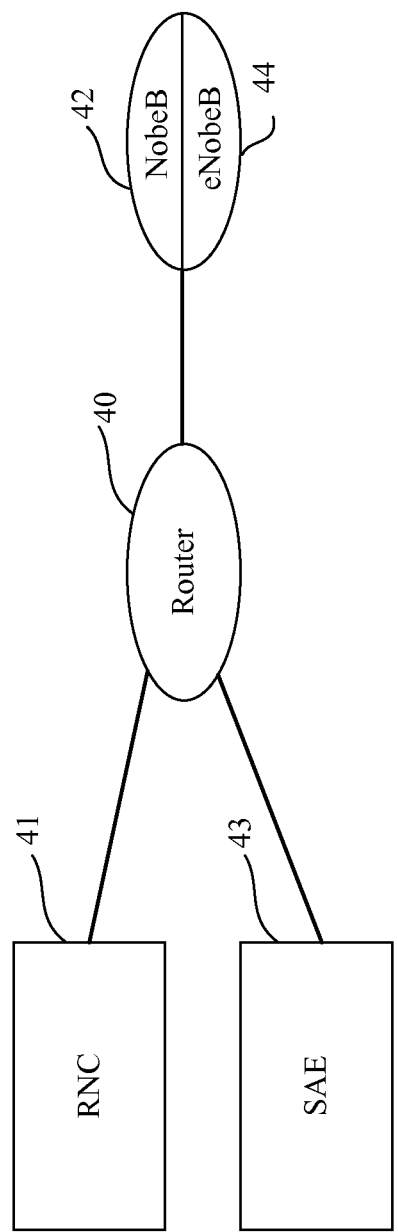
FIG. 8 is a schematic diagram of a co-transmission communications system including UMTS and LTE according to an embodiment of the present invention.

The following further describes the communications device with reference to FIG. 8 through an example where the foregoing communications device is used in an RNC (a first network element) of a UMTS system (a first communications system).

The communications device is used in an RNC of a UMTS system, including: a configuration unit 20, a comparison unit 21, a priority adjustment unit 22, a traffic molding unit 23, a monitoring unit 25, and a sending bandwidth dynamic adjustment unit 24.

The configuration unit 20 may configure bandwidth parameters on the RNC side, including:

total bandwidth (Total Bandwidth, TBW): defined as total bandwidth that a transmission network may provide to a base station; and UMTS guaranteed bandwidth (UMTS Guaranteed Bandwidth, UGBW) (that is, bandwidth preconfigured for communicating with a base station): defined as UMTS guaranteed bandwidth, and UGBW is required not to exceed TBW.

The comparison unit 21 compares a sending rate at which a service packet is sent and which is measured in real time with guaranteed bandwidth (UGBW) to obtain a comparison result; the priority adjustment unit 22 dynamically adjusts and marks a transmission priority of a sent non-real-time service packet based on the comparison result of the comparison unit 21: when the sending rate does not exceed UGBW, mark a transmission priority of a UMTS non-real-time service packet as a high priority (for example: mark a DSCP priority of an IP packet as 46, and during initial configuration, mark a priority of a VLAN of an Ethernet MAC frame as 6); when the sending rate exceeds UGBW, mark the transmission priority of a UMTS non-real-time service packet as a low priority (for example, mark a DSCP priority of an IP packet as 0, and during initial configuration, mark a priority of a VLAN of an Ethernet MAC frame as 0).

The monitoring unit 25 is set in the RNC, cooperates with a NodeB (a base station in a UMTS system), transmits a structured measurement packet (including a detection packet and a response packet) between the RNC and the NodeB, and monitors transmission quality of the transmitted measurement packet to obtain congestion status (in FIG. 8, a dashed line arrow indicates a measurement packet and a solid line arrow indicates a service packet) of Iub interface transmission.

The monitoring unit 25 may detect transmission quality (including counters, such as packet loss rate, delay and jitter, and so on) of an Iub interface and obtain transmission congestion status. The basic manner may be as follows:
accumulate the number of sent packets on the Iub interface;
send a detection packet to a NodeB every detection packet sending period (for example, 100 ms). Detection packet frame number contents include: a frame number, the number of sent packets (that is the accumulated number of sent packets on an Iub interface) and sending time (that is time for sending a detection packet);
calculate a delay after a response packet frame sent by the NodeB is received:

a delay=receiving time in a response packet frame−sending time in a response frame;

and
perform transmission congestion judgment every congestion judgment period (for example, 1s):
calculating the total number of sent packets in a current congestion judgment period: the number of sent packets of the last response packet received in the current period−the number of sent packets of the last response packet received in the previous period;
calculating the total number of received packets in a current congestion judgment period: the number of received packets of the last response packet received in the current period−the number of received packets of the last response packet received in the previous period;
calculating the average packet loss rate in a current congestion judgment period: (the total number of sent packets in the period−the total number of received packets in the period)÷the total number of sent packets in the current period; and
calculating the average delay in a current congestion judgment period (defined as: the sum of delays of all received response packets÷the total number of all received response packets).

If an average packet loss rate exceeds a congestion judgment threshold (for example, 10%) or an average delay exceeds a congestion judgment threshold (for example, 50 ms), it is considered that the transmission congestion status is "congested status"; otherwise, it is considered that the transmission congestion status is "decongested status".

If the transmission congestion status changes, it is notified to a sending bandwidth dynamic adjustment unit.

A function of setting a transmission quality measurement subunit B on the NodeB side is to detect transmission quality of an Iub interface, where basic contents are as follows:
accumulate the number of received packets on the Iub interface; and
after receiving a detection packet sent by an RNC, structure a response packet and reply to the RNC (reply to the monitoring unit 25 set in the RNC); where
contents of a response packet include: a frame number (which is the frame number in a detection packet), the number of sent packets (which is the number of sent packets in a detection packet), sending time (which is the sending time in a detection packet), the number of received packets (which is the accumulated number of received packets on an Iub interface) and receiving time (which is the time for receiving a detection packet).

In this way, a transmission quality measurement subunit A on the RNC side and a transmission quality measurement subunit B on the NodeB side cooperate with each other, so that monitoring may be performed on the congestion status of transmission over the Iub interface.

The sending bandwidth dynamic adjustment unit 24 dynamically adjusts sending bandwidth based on the transmission congestion status obtained by the monitoring unit 25: when the transmission congestion status is congested status, decrease sending bandwidth and limit the sending bandwidth not to be lower than UGBW; when the transmission congestion status is decongested status, increase sending bandwidth and limit the sending bandwidth not to exceed TBW. After adjustment is performed on sending bandwidth, it is notified to the priority adjustment unit 22 and the traffic molding unit 23; and the traffic molding unit 23 may use a token bucket algorithm to perform traffic molding and limit a sending rate of the RNC not to exceed sending bandwidth provided by the sending bandwidth dynamic adjustment unit 24.

Figure 7:
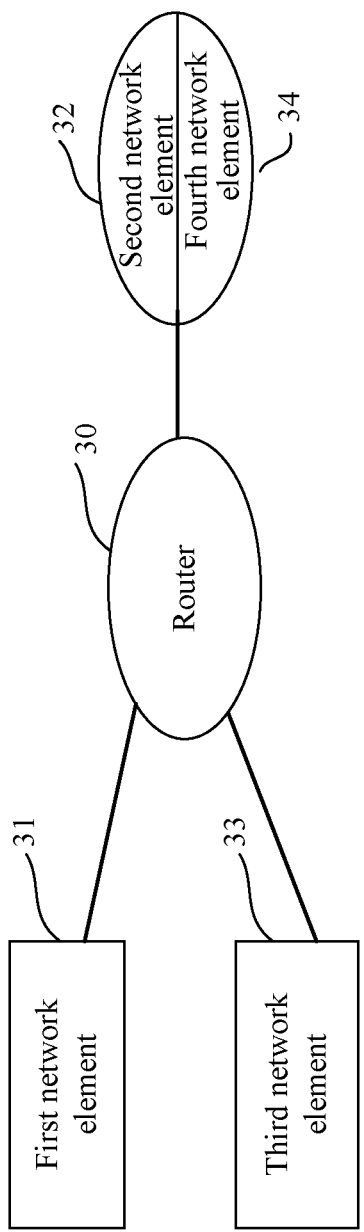
FIG. 7 is a schematic diagram of a communications system according to an embodiment of the present invention.

An embodiment of the present invention provides a communications system, as shown in FIG. 7, where the communications system includes a first communications system and one or more other communications systems, and the first communications system and the one or more other communications systems share transmission bandwidth; and the first communications system includes the foregoing communications device; that is, at least one of a first network element 31 and a second network element 32 in the first communications system which are in communication connection with each other through a router 30 uses the foregoing communications device.

The first communications system in the foregoing system is a universal mobile communications system, where a first network element in the first communications system is a radio network controller (RNC) and a second network element in the first communications system is a Node B (NodeB); or, a first network element in the first communications system is a Node B (NodeB) and a second network element in the first communications system is a radio network controller (RNC); and the one or more other communications systems in the foregoing system is long term evolution (LET). Another communications system may include at least a third network element 33 and a fourth network element 34 which are in communication connection with each other, and the third network element 33 and the fourth network element 34 may be in communication connection with each other through the router 30.

The following further describes the foregoing communications system with reference to FIG. 8 and by using a scenario in which a first communications system is UMTS, one or more other communications systems is LTE, and the UMTS and the LTE share transmission bandwidth, in which, in the first communications system, a first network element is an RNC (Radio Network Controller, radio network controller) 41, a second network element is a NodeB (UTRAN NodeB, E-UTRAN node B, universal terrestrial radio access network node B) 42, the RNC 41 in the UMTS is in communication connection with the NodeB 42, and an SAE 43 in the LTE is in communication connection with an eNodeB 44, in which, the RNC 41 is in communication connection with the NodeB 42 through the router 40 and the SAE 43 is also in communication connection with the eNodeB 44 through the same router 40;

where the RNC 41 adopts the communications device provided in the foregoing embodiment. The RNC 41 may dynamically adjust, based on a sending rate, a transmission priority of a non-real-time service packet sent to the NodeB 42, and dynamically adjust sending bandwidth for the RNC 41 based on transmission congestion status of an interface between the RNC 41 and the NodeB 42 obtained through monitoring, thereby solving the problems that fair distribution of shared bandwidth cannot be ensured, and bandwidth utilization cannot be effectively improved due to bandwidth contention between two communications systems of the UMTS and the LTE during co-transmission. This type of communications system may implement bandwidth statistics multiplexing between different systems, where, if a system is idle, while the other system has sufficient traffic, bandwidth of the idle system may be used. Effects on transmission bandwidth utilization imposed by congestion and packet loss on an interface are avoided, thereby ensuring fairness of bandwidth distribution between two systems, and avoiding the problem that an LTE network element (such as an SAE) in another communications system is starved to death because transmission bandwidth cannot be distributed.

Figure 9:
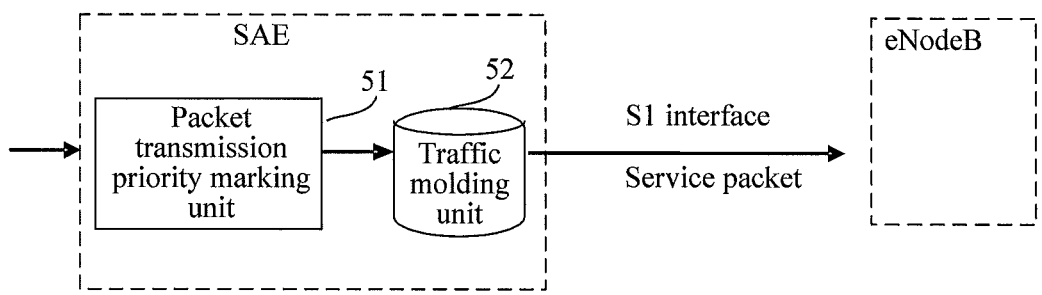
FIG. 9 is a schematic structural diagram of a communications device serving as an SAE in another communications system according to an embodiment of the present invention.

The one or more other communications systems in the foregoing communications system includes at least two network elements (for example, which may be an SAE 43 and an eNodeB 44) in communication connection with each other through the same router 40, in which either network element may adopt a communications device shown in FIG. 9. The communications device includes: a transmission priority marking unit 51 and a traffic molding unit 52; where the transmission priority marking unit 51 is adapted to mark a transmission priority of a service sent to another network element in another communications system as a low priority, where the low priority is equal to or lower than a transmission priority of the service sent by a first network element in a first communications system to a second network element; and the traffic molding unit 52 is adapted to mold traffic and limit the sum of rates at which a service is sent to another network element in the another communications system not to exceed total transmission bandwidth.

The method in the embodiment of the present invention not only is applicable to a scenario of co-transmission between the UMTS and the LTE, but also may be applied to transmission bandwidth sharing between different systems, such as GSM (Global System For Mobile Communication, global system for mobile communications) & LTE (System Architecture Evolution, system architecture evolution) and CDMA (Code Division Multiple Access, code division multiple access) & WiMAX (Worldwide Interoperability for Microwave Access, worldwide interoperability for microwave access), and so on, and also may be used for performing transmission bandwidth sharing between two independently deployed network elements.

According to the above, in the methods provided by the embodiments of the present invention, a transmission priority of a UMTS non-real-time service packet is dynamically adjusted based on the sum of rates at which an RNC transmits a service, and sending bandwidth for the RNC is dynamically adjusted based on transmission congestion status, to implement fair distribution of transmission bandwidth shared between different systems, so that the problem of bandwidth contention between different systems sharing transmission bandwidth is well solved. A communication device, or network element, includes hardware to execute the described functions.

The foregoing descriptions are merely exemplary specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for sharing transmission bandwidth between different communications systems, wherein when a first communications system and one or more other communications systems share a transmission bandwidth, the method comprises:

comparing, by a first network element in the first communications system, a sum of rates at which a service packet is sent to a second network element in the first communications system with a transmission bandwidth preconfigured for the second network element from the shared transmission bandwidth;

adjusting, by the first network element based on a comparison result of the comparing, a transmission priority of the service packet sent to the second network element relative to a transmission priority of a service packet sent by a third network element to a fourth network element in other communications system; and adjusting, by the first network element based on a transmission congestion status of the first communications system, sending bandwidth for sending the service packet to the second network element, wherein the transmission bandwidth preconfigured for the second network element in the first communications system is:

transmission bandwidth from the shared transmission bandwidth for ensuring that the first network element in the first communications system works in full load when both the first network element in the first communications system and the third network element sending the service packet to the fourth network element in the other communications system that shares the shared transmission bandwidth with the first communications system work in full load, to thereby control distribution of the shared transmission bandwidth between the first communications system and the other communications system, according to the adjusting, by the first network element, of the transmission priority of the service packet sent to the second network element and the adjusting, by the first network element, of the sending bandwidth for sending the service packet to the second network element.

2. The method for sharing transmission bandwidth between different communications systems according to claim 1, wherein the adjusting, by the first network element, of the transmission priority of the service packet sent to the second network element comprises:

when the sum of rates does not exceed the transmission bandwidth preconfigured for the second network element, adjusting the transmission priority of the service packet sent to the second network element to be higher than the transmission priority of the service packet in the other communications systems.

3. The method for sharing transmission bandwidth between different communications systems according to claim 1, wherein the adjusting, by the first network element, of the transmission priority of the service packet sent to the second network element comprises:

when the sum of rates exceeds the transmission bandwidth preconfigured for the second network element, adjusting the transmission priority of the service packet sent to the second network element to be equal to or lower than the transmission priority of the service packet in the other communications systems.

4. The method for sharing transmission bandwidth between different communications systems according to claim 1, wherein the adjusting, by the first network element, of the transmission priority of the service packet sent to the second network element is:
  adjusting a transmission priority of a non-real-time service packet sent by the first network element to the second network element.

5. The method for sharing transmission bandwidth between different communications systems according to claim 1, wherein the transmission congestion status of the first communications system is obtained by monitoring a transmission channel between the first network element and the second network element.

6. The method for sharing transmission bandwidth between different communications systems according to claim 1, wherein the adjusting, by the first network element, the sending bandwidth for sending the service packet to the second network element comprises:
  when the transmission congestion status is congested status, decreasing the sending bandwidth for sending the service packet to the second network element, and limiting the decreased sending bandwidth not to be lower than the bandwidth preconfigured for the second network element; or
  when the transmission congestion status is decongested status, increasing the sending bandwidth for sending the service packet to the second network element, and limiting the increased sending bandwidth not to exceed the shared transmission bandwidth.

7. The method for sharing transmission bandwidth between different communication systems according to claim 1, further comprising:
  when the first network element in the first communications system transmits the service packet to the second network element, performing traffic molding based on the sending bandwidth and limiting the sending bandwidth not to exceed the sending bandwidth for sending the service packet to the second network element after being adjusted by the first network element based on the transmission congestion status of the first communications system.

8. The method for sharing transmission bandwidth between different communication systems according to claim 1, wherein the first communications system is a universal mobile communications system; and the other communications systems is a long term evolution system.

9. The method for sharing transmission bandwidth between different communications systems according to claim 7, wherein the first network element in the first communications system is a radio network controller, and the second network element in the first communications system is a node B; or
  the first network element in the first communications system is a node B, and the second network element in the first communications system is a radio network controller.

10. A communications device configured as a first network element for a first communications system which shares transmission bandwidth with one or more other communications systems, the communication device comprising:
  a comparison unit, adapted to compare a sum of rates at which a service packet is sent to a second network element in the first communications system with a transmission bandwidth preconfigured for the second network element from the shared transmission bandwidth;
  a priority adjustment unit, adapted to adjust, based on a comparison result of the comparison unit, a transmission priority of the service packet sent to the second network element relative to a transmission priority of a service packet sent by a third network element to a fourth network element in other communications system; and
  a sending bandwidth dynamic adjustment unit, adapted to adjust, based on a transmission congestion status of the first communications system, sending bandwidth for sending the service packet to the second network element,
  wherein the bandwidth preconfigured for the second network element in the first communications system is:
    transmission bandwidth from the shared transmission bandwidth for ensuring that the first network element in the first communications system works in full load when both the first network element in the first communications system and the third network element sending the service packet to the fourth network element in the other communications system that shares the shared transmission bandwidth with the first communications system work in full load,
  to thereby control distribution of the shared transmission bandwidth between the first communications system and the other communications system, according to the adjusting, by the first network element, of the transmission priority of the service packet sent to the second network element and the adjusting, by the first network element, of the sending bandwidth for sending the service packet to the second network element.

11. The communications device according to claim 10, wherein the priority adjustment unit comprises:
  a high priority adjustment subunit, adapted to adjust a transmission priority of the service packet sent to the second network element to be higher than a transmission priority of the service packet in the other communications systems, when the sum of rates does not exceed the bandwidth preconfigured for the second network element.

12. The communications device according to claim 10, wherein the priority adjustment unit comprises:
  a low priority adjustment subunit, adapted to adjust a transmission priority of the service packet sent to the second network element to be equal to or lower than a transmission priority of the service packet in the other communications systems, when the sum of rates exceeds the bandwidth preconfigured for the second network element.

13. The communications device according to claim 10, wherein the sending bandwidth dynamic adjustment unit comprises:
  a transmission congestion status judgment unit and a bandwidth adjustment subunit; wherein
  the transmission congestion status judgment unit is adapted to perform judgment on obtained transmission congestion status of the first communications system; and
  the bandwidth adjustment subunit is adapted to, when the transmission congestion status obtained through judgment by the transmission congestion status judgment unit is congested status, decrease the sending bandwidth for sending the service packet to the second network element and limit the decreased sending bandwidth not to be lower than the bandwidth preconfigured for the second network element; or
  when the transmission congestion status obtained through judgment by the transmission congestion status judgment unit is decongested status, increase the sending bandwidth for sending the service packet to the second network element and limit the increased sending bandwidth not to exceed the shared transmission bandwidth.

14. The communications device according to claim 10, further comprising:
- a monitoring unit, adapted to transmit a structured measurement packet on a transmission channel between and a second network element, and obtain transmission congestion status of the transmission channel by monitoring transmission quality of the transmitted measurement packet.

15. The communications device according to claim 10, further comprising:
- a traffic molding unit, adapted to, when the service packet is transmitted to the second network element in the first communications system, perform traffic molding based on the sending bandwidth, and limit the sending bandwidth not to exceed sending bandwidth determined by the sending bandwidth dynamic adjustment unit.

16. A communications system, comprising:
a first communications system and one or more other communications systems,
the first communications system comprises:
- a communications device configured as a first network element for the first communications system, wherein the communications device comprises:
  - a comparison unit, adapted to compare a sum of rates at which a service packet is sent to a second network element in a first communications system with a transmission bandwidth preconfigured for the second network element from a shared transmission bandwidth, wherein the first communications system shares shared transmission bandwidth with the one or more other communications systems;
  - a priority adjustment unit, adapted to adjust, based on a comparison result of the comparison unit, a transmission priority of the service packet sent to the second network element relative to a transmission priority of a service packet sent by a third network element to a fourth network element in other communications system; and
  - a sending bandwidth dynamic adjustment unit, adapted to adjust, based on a transmission congestion status of the first communications system, sending bandwidth for sending the service packet to the second network element,
  wherein the transmission bandwidth preconfigured for the second network element in the first communications system is:
    transmission bandwidth from the shared transmission bandwidth for ensuring that the first network element in the first communications system works in full load when both the first network element in the first communications system and the third network element sending the service packet to the fourth network element in the other communications system that shares the shared transmission bandwidth with the first communications system work in full load,
  to thereby control, by the first network element, distribution of the shared transmission bandwidth between the first communications system and the other communications system, according to the adjusting, by the first network element, of the transmission priority of the service packet sent to the second network element and the adjusting, by the first network element, of the sending bandwidth for sending the service packet to the second network element.

17. The communications system according to claim 16, wherein the first communications system is a universal mobile communications system; and the other communications systems is a long term evolution system.

18. The communications system according to claim 16, wherein a first network element in the first communications system is a radio network controller, and a second network element in the first communications system is a node B; or
the first network element in the first communications system is a node B, and the second network element in the first communications system is a radio network controller.

19. The communications system according to claim 16, wherein the third and fourth network elements in the other communications system comprise:
a transmission priority marking unit and a traffic molding unit,
wherein:
the transmission priority marking unit is adapted to mark a transmission priority of the service packet sent to the fourth network element as a low priority, wherein the low priority is equal to or lower than a transmission priority of the service packet sent by the first network element in the first communications system to the second network element; and
the traffic molding unit is adapted to mold traffic and limit a sum of rates at which the service packet is sent to the fourth network element not to exceed the shared transmission bandwidth between the first and the other communications system.

* * * * *

UNITED STATES PATENT AND TRADEMARK OFFICE
CERTIFICATE OF CORRECTION

| | | |
|---|---|---|
| PATENT NO. | : 9,185,567 B2 | Page 1 of 1 |
| APPLICATION NO. | : 13/928967 | |
| DATED | : November 10, 2015 | |
| INVENTOR(S) | : Chenhui Ge | |

It is certified that error appears in the above-identified patent and that said Letters Patent is hereby corrected as shown below:

ON THE TITLE PAGE

Second Page, Second Column, Item (56) OTHER PUBLICATIONS, Line 10

Delete "No. Oct. 2013-7017674" and insert --No. 10-2013-7017674--, therefor.

Signed and Sealed this
Seventeenth Day of May, 2016

Michelle K. Lee
*Director of the United States Patent and Trademark Office*